US012597223B2

(12) United States Patent
Fukui

(10) Patent No.: US 12,597,223 B2
(45) Date of Patent: Apr. 7, 2026

(54) INFORMATION PROCESSING APPARATUS, INFORMATION PROCESSING METHOD, AND COMPUTER PROGRAM

(71) Applicant: NEC Corporation, Tokyo (JP)

(72) Inventor: Hiroshi Fukui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 310 days.

(21) Appl. No.: 18/034,513

(22) PCT Filed: Nov. 13, 2020

(86) PCT No.: PCT/JP2020/042445
§ 371 (c)(1),
(2) Date: Apr. 28, 2023

(87) PCT Pub. No.: WO2022/102083
PCT Pub. Date: May 19, 2022

(65) Prior Publication Data
US 2023/0394784 A1 Dec. 7, 2023

(51) Int. Cl.
G06V 10/44 (2022.01)
G06T 5/77 (2024.01)
G06T 7/73 (2017.01)

(52) U.S. Cl.
CPC ............... G06V 10/44 (2022.01); G06T 5/77 (2024.01); G06T 7/73 (2017.01); G06V 2201/07 (2022.01)

(58) Field of Classification Search
CPC .... G06V 10/44; G06V 2201/07; G06V 10/26; G06V 10/50; G06V 10/764; G06T 5/77; G06T 7/73
See application file for complete search history.

(56) References Cited

U.S. PATENT DOCUMENTS

| | | | | |
|---|---|---|---|---|
| 10,650,548 B1 * | 5/2020 | Kim | ....................... | G01C 21/28 |
| 2020/0084427 A1 * | 3/2020 | Sun | ..................... | G06N 3/0895 |
| 2020/0279024 A1 | 9/2020 | Misawa et al. | | |

FOREIGN PATENT DOCUMENTS

| | | |
|---|---|---|
| JP | 2020-016784 A | 1/2020 |
| JP | 2020-140469 A | 9/2020 |

OTHER PUBLICATIONS

"Paul Voigtlaender et. al., FEELVOS: Fast End-to-End Embedding Learning for Video Object Segmentation, 2019, Proceedings of the IEEE/CVF Conference on Computer Vision and Pattern Recognition, pp. 9481-9491" (Year: 2019).*
"Berta Bescos et. al., Empty Cities: Image Inpainting for a Dynamic-Object-Invariant Space, May 2019, 2019 International Conference on Robotics and Automation, Montreal, Canada" (Year: 2019).*

(Continued)

*Primary Examiner* — Chineyere Wills-Burns
*Assistant Examiner* — Phuong Hau Cai
(74) *Attorney, Agent, or Firm* — Sughrue Mion, PLLC

(57) ABSTRACT

An information processing apparatus includes at least one memory storing instructions, and at least one processor, which executes the instructions to extract a feature quantity from image data, obtain a partial feature quantity by extracting a particular position from the feature quantity, perform a predetermined arithmetic process by using the partial feature quantity, and restore a result of the predetermined arithmetic process to a size of the feature quantity.

10 Claims, 18 Drawing Sheets

(56)                    References Cited

OTHER PUBLICATIONS

International Search Report for PCT Application No. PCT/JP2020/
042445, mailed on Feb. 2, 2021.
Okatani, Takayuki, "Research trend in deep learning for visual
recognition-Advances of convolutional neural networks and their
use—", Journal of the Japanese Society for Artificial Intelligence),
non-official translation, Mar. 1, 2016, vol. 31, No. 2, pp. 169-179,
particularly, 5.3 Variable size output (feature map).

* cited by examiner

10:INFORMATION
PROCESSING
APPARATUS 110          120          130          140

EXTRACTION
UNIT

ACQUISITION
UNIT

PATTERN
STORAGE
UNIT          122

ARITHMETIC
UNIT

RESTORATION
UNIT

EXTRACTED
FEATURE MAP

PARTIAL FEATURE
QUANTITY CUT OUT

INFORMATION PROCESSING APPARATUS, INFORMATION PROCESSING METHOD, AND COMPUTER PROGRAM

This application is a National Stage Entry of PCT/JP2020/042445 filed on Nov. 13, 2020, the contents of all of which are incorporated herein by reference, in their entirety.

TECHNICAL FIELD

This disclosure relates to an information processing apparatus, an information processing method, and a computer program that process information about a feature quantity.

BACKGROUND ART

A known apparatus of this type uses an attention mechanism. For example, Patent Literature 1 discloses that a speech recognition model that extracts a speech feature quantity and uses it as an embedded vector may include an attention mechanism. Patent Literature 2 discloses that an attention mechanism for generating a sentence by weighting a word may be utilized when a new sentence is outputted from an inputted sentence.

CITATION LIST

Patent Literature

Patent Literature 1: JP2020-016784A
Patent Literature 2: JP2020-140469A

SUMMARY

Technical Problem

This disclosure aims to improve the related techniques/technologies described above.

Solution to Problem

An information processing apparatus according to an example aspect of this disclosure includes: an extraction unit that extracts a feature quantity from image data; an acquisition unit that obtains a partial feature quantity by cutting out a particular position from the feature quantity; an arithmetic unit that performs a predetermined arithmetic process by using the partial feature quantity; and a restoration unit that restores a result of the predetermined arithmetic process to a size of the feature quantity.

An information processing method according to an example aspect of this disclosure includes: extracting a feature quantity from image data; obtaining a partial feature quantity by cutting out a particular position from the feature quantity; performing a predetermined arithmetic process by using the partial feature quantity; and restoring a result of the predetermined arithmetic process to a size of the feature quantity.

A computer program according to an example aspect of this disclosure operates a computer: to extract a feature quantity from image data; to obtain a partial feature quantity by cutting out a particular position from the feature quantity; to perform a predetermined arithmetic process by using the partial feature quantity; and to restore a result of the predetermined arithmetic process to a size of the feature quantity.

DESCRIPTION OF EXAMPLE EMBODIMENTS

Hereinafter, an information processing apparatus, an information processing method, and a computer program according to example embodiments will be described with reference to the drawings.

First Example Embodiment

An information processing apparatus according to a first example embodiment will be described with reference to FIG. 1 to FIG. 3.

(Hardware Configuration)

First, with reference to FIG. 1, a hardware configuration of the information processing apparatus according to the first example embodiment will be described. FIG. 1 is a block diagram illustrating the hardware configuration of the information processing apparatus according to the first example embodiment.

Figure 1:
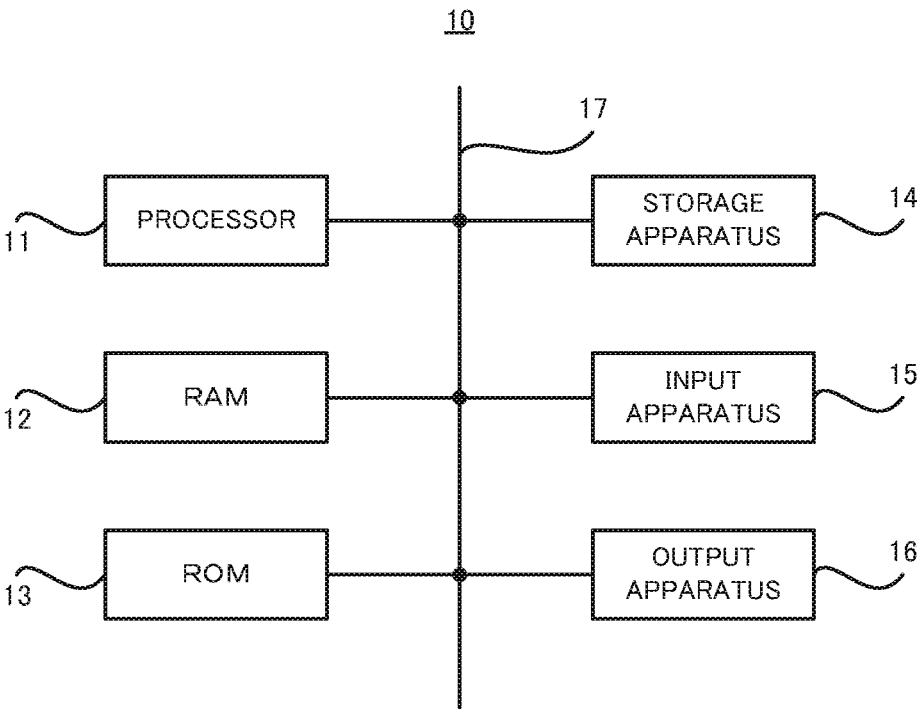
FIG. 1 is a block diagram illustrating a hardware configuration of an information processing apparatus according to a first example embodiment.

As illustrated in FIG. 1, an information processing apparatus 10 according to the first example embodiment includes a processor 11, a RAM (Random Access Memory) 12, a ROM (Read Only Memory) 13, and a storage apparatus 14. The information processing apparatus 10 may further include an input apparatus 15 and an output apparatus 16. The processor 11, the RAM 12, the ROM 13, the storage apparatus 14, the input apparatus 15, and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium by using a not-illustrated recording medium reading apparatus. The processor 11 may obtain (i.e., may read) a computer program from a not-illustrated apparatus disposed outside the information processing apparatus 10, through a network interface. The processor 11 controls the RAM 12, the storage apparatus 14, the input apparatus and the output apparatus 16 by executing the read computer program. Especially in the example embodiment, when the processor 11 executes the read computer program, a functional block for performing various processes related to a feature quantity is realized or implemented in the processor 11. An example of the processor 11 includes a CPU (Central Processing Unit), a GPU (Graphics Processing Unit), an FPGA (field-programmable gate array), a DSP (Demand-Side Platform), and an ASIC (Application Specific Integrated Circuit). The processor 11 may use one of the examples, or may use a plurality of them in parallel.

The RAM 12 temporarily stores the computer program to be executed by the processor 11. The RAM 12 temporarily stores the data that is temporarily used by the processor 11 when the processor 11 executes the computer program. The RAM 12 may be, for example, a D-RAM (Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that is stored for a long term by the information processing apparatus 10. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the information processing apparatus 10. The input apparatus 15 may include, for example, at least one of a keyboard, a mouse, and a touch panel. The input apparatus 15 may be a dedicated controller (operation terminal). The input apparatus 15 may also include a terminal owned by the user (e.g., a smartphone or a tablet terminal, etc.). The input apparatus 15 may be an apparatus that allows audio input, including a microphone, for example.

The output apparatus 16 is an apparatus that outputs information about the information processing apparatus 10 to the outside. For example, the output apparatus 16 may be a display apparatus (e.g., a display) that is configured to display the information about the information processing apparatus 10. The display apparatus here may be a TV monitor, a personal computer monitor, a smartphone monitor, a tablet terminal monitor, or another portable terminal monitor.

The display apparatus may be also a large monitor or a digital signage installed in various facilities such as stores. Furthermore, the output apparatus 16 may be an apparatus that outputs information in a format other than an image. For example, the output apparatus 16 may be a speaker that outputs the information about the information processing apparatus 10 in a form of audio.

(Functional Configuration)

Next, a functional configuration of the information processing apparatus 10 according to the first example embodiment will be described with reference to FIG. 2. FIG. 2 is a block diagram illustrating the functional configuration of the information processing apparatus according to the first example embodiment.

Figure 2:
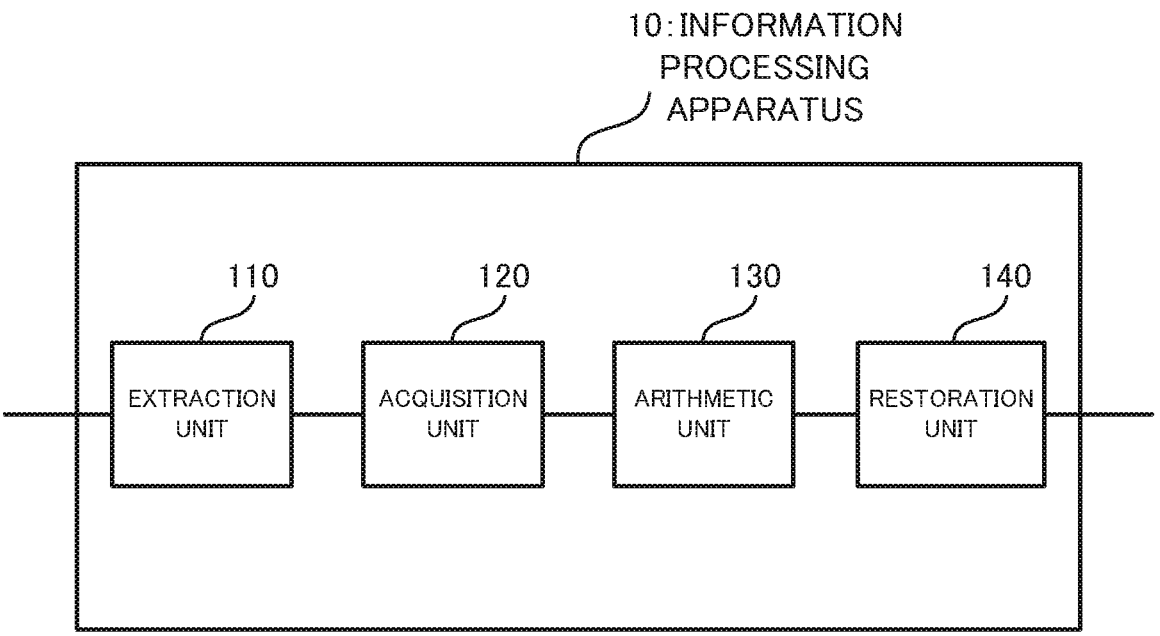
FIG. 2 is a block diagram illustrating a functional configuration of the information processing apparatus according to the first example embodiment.

As illustrated in FIG. 2, the information processing apparatus 10 according to the first example embodiment includes, as processing blocks for realizing its functions, an extraction unit 110, an acquisition unit 120, an arithmetic unit 130, and a restoration unit 140. Each of the extraction unit 110, the acquisition unit 120, the arithmetic unit 130, and the restoration unit 140 may be realized by the processor 11 (see FIG. 1).

The extraction unit 110 is configured to extract a feature quantity from an image. The "feature quantity" here is data converted to indicate a characteristic area and position to be used for recognition, so as to recognize a target that is in an image in a particular task, and can be extracted by performing a predetermined extraction process on image data, for example, it can be extracted by performing a predetermined extracting processing on area. A detailed description of a specific method of extracting the feature quantity will be omitted, because the existing techniques/technologies can be adopted as appropriate. The feature quantity extracted by the extraction unit 110 is configured to be outputted to the acquisition unit 120.

The acquisition unit 120 is configured to cut out a part of the feature quantity extracted from the image data and to obtain a partial feature quantity. Alternatively, the acquisition unit 120 may obtain the partial feature quantity by cutting out a part of an image and then performing an extraction process on the cut part. In addition, the acquisition unit 120 may obtain the partial feature quantity by specifying a part of the feature quantity. The acquisition unit 120 may obtain the partial feature quantity by narrowing down a part of the feature quantity. The acquisition unit 120 may obtain the partial feature quantity by dividing the feature quantity and selecting a part. Since the partial feature quantity is obtained by cutting out a part of the feature quantity as described above, it has a smaller data amount than that of the original feature quantity. Which part of the feature quantity is to be cut out will be described in detail in another example embodiment described later. The partial feature quantity cut out by the acquisition unit 120 is configured to be inputted to the arithmetic unit 130.

The arithmetic unit 130 is configured to perform various arithmetic processes by using the partial feature quantity extracted by the acquisition unit 120. The arithmetic unit 130 may be configured to perform an arithmetic operation a plurality of times. For example, the arithmetic unit 130 may perform a first arithmetic process and then perform a second arithmetic process. In this case, the first arithmetic process and the second arithmetic process may be the same type of arithmetic process, or may be different arithmetic processes. The arithmetic unit 130 may perform three or more arithmetic processes. Furthermore, the arithmetic unit 130 may be configured to perform a plurality of types of arithmetic processes. The arithmetic unit 130 may be perform the arithmetic process by using information other than the partial feature quantity (e.g., the feature quantity before cutting out), in addition to the partial feature quantity. Specific contents of the arithmetic process performed by the arithmetic unit 130 will be described in detail in another example embodiment described later. An arithmetic result of the arithmetic unit 130 is configured to be outputted to the restoration unit 140.

The restoration unit 140 is configured to restore the arithmetic result of the arithmetic unit 130 (i.e., the arithmetic result using the partial feature quantity) to a size of the feature quantity before cutting out (i.e., a size of the feature quantity extracted by the extraction unit 110). Specific contents of a restoration process performed by the restoration unit 140 will be described in detail in another example embodiment described later.

(Flow of Operation)

Next, a flow of operation of the information processing apparatus 10 according to the first example embodiment will be described with reference to FIG. 3. FIG. 3 is a flowchart illustrating the flow of the operation of the information processing apparatus according to the first example embodiment.

Figure 3:
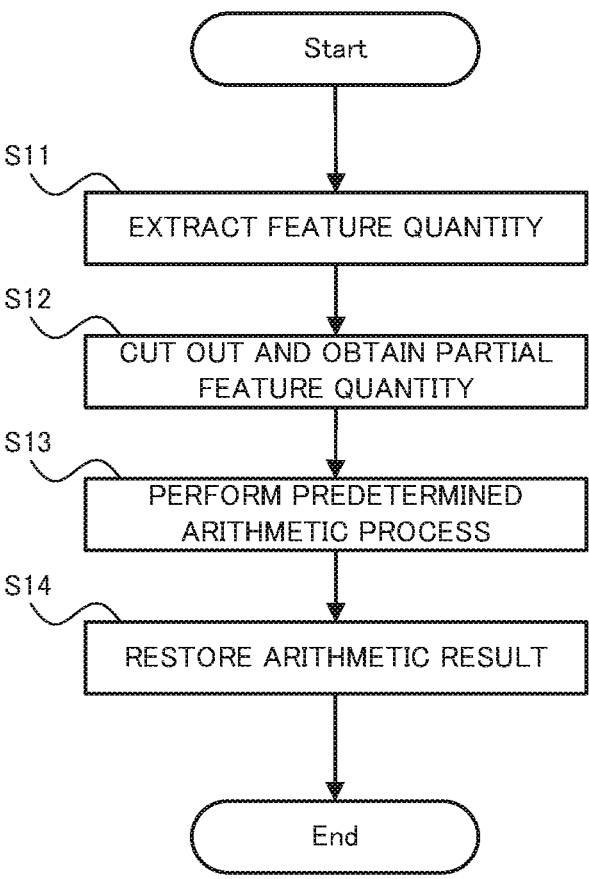
FIG. 3 is a flowchart illustrating a flow of operation of the information processing apparatus according to the first example embodiment.

As illustrated in FIG. 3, when the operation of the information processing apparatus 10 according to the first example embodiment is started, the extraction unit 110 firstly extracts the feature quantity from the image data (step S11). Subsequently, the acquisition unit 120 cuts out a part of the extracted feature quantity and obtains the partial feature quantity (step S12). Subsequently, the arithmetic unit 130 performs the arithmetic process by using the cutout partial feature quantity (step S13). Subsequently, the restoration unit 140 restores the arithmetic result of the arithmetic unit 130 to the size of the original feature quantity (step S14).

Technical Effect

Next, a technical effect obtained by the information processing apparatus 10 according to the first example embodiment will be described.

As described in FIG. 1 to FIG. 3, in the information processing apparatus 10 according to the first example embodiment, the partial feature quantity is cut out from the feature quantity, and the arithmetic process is performed by using the cutout partial feature quantity. In this way, it is possible to reduce a load applied to the arithmetic process, as compared with a load when the arithmetic process is performed on the feature quantity as it is. After the arithmetic process is performed, the arithmetic result is restored to the size of the feature quantity. Therefore, even when the arithmetic process is performed by using the partial feature quantity (in other words, the feature quantity with a small size into which the actual feature quantity is converted), it is possible to obtain an appropriate size of data in the end.

Since the feature quantity of the image data increases in accordance with resolution, for example, if a data size of the feature quantity increases, throughput in the arithmetic process may be enormous. The information processing apparatus 10 according to the present exemplary example embodiment exhibits a remarkable technical effect when the load of the arithmetic process is extremely large as described above.

Second Example Embodiment

The information processing apparatus 10 according to a second example embodiment will be described with reference to FIG. 4 and FIG. 5. The second example embodiment is partially different from the first example embodiment only in the configuration and operation, and may be the same as the first example embodiment in the hardware configuration (see FIG. 1) or the like, for example. For this reason, a part that is different from the first example embodiment will be described in detail below, and a description of other overlapping parts will be omitted as appropriate.

(Functional Configuration) First, with reference to FIG. 4, a functional configuration of the information processing apparatus 10 according to the second example embodiment will be described. FIG. 4 is a block diagram illustrating the functional configuration of the information processing apparatus according to the second example embodiment. In FIG. 4, the same components as those illustrated in FIG. 2 carry the same reference numerals.

Figure 4:
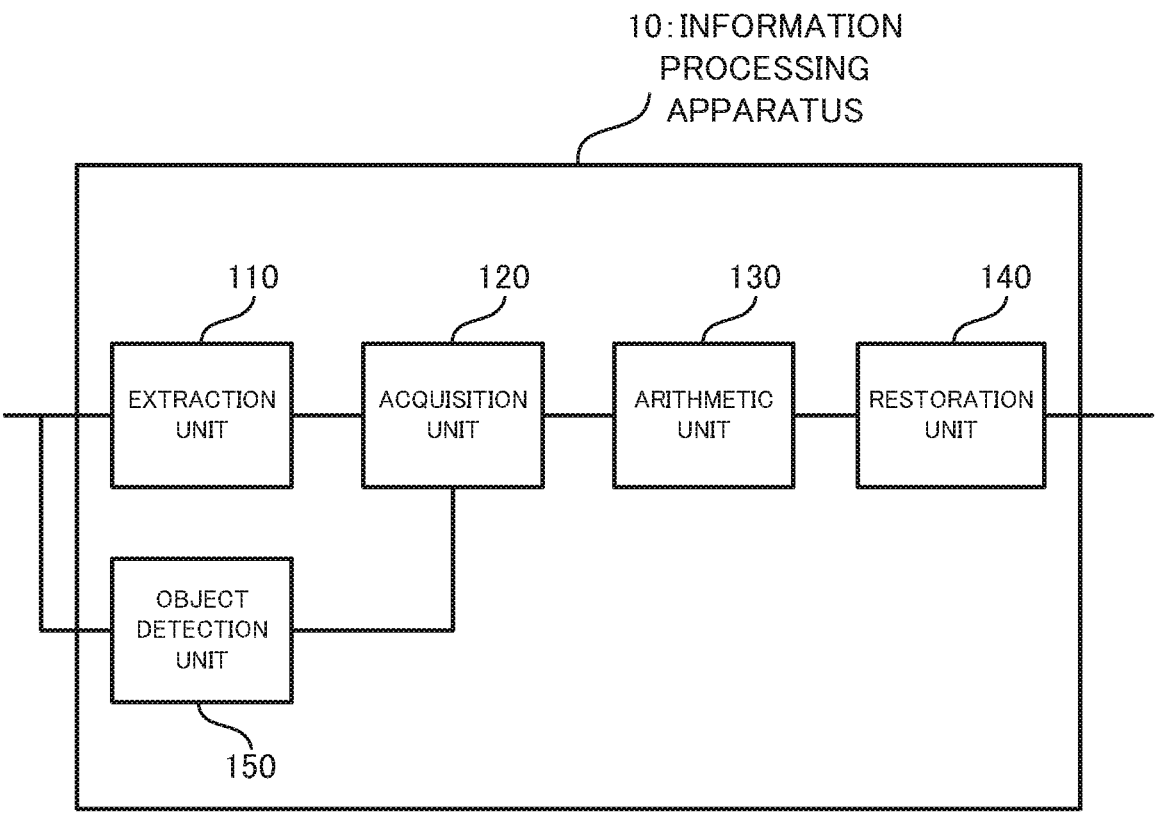
FIG. 4 is a block diagram illustrating a functional configuration of an information processing apparatus according to a second example embodiment.

As illustrated in FIG. 4, the information processing apparatus 10 according to the second example embodiment includes, as processing blocks for realizing its functions, the extraction unit 110, the acquisition unit 120, the arithmetic unit 130, the restoration unit 140, and an object detection unit 150. That is, the information processing apparatus 10 according to the second example embodiment further includes the object detection unit 150 in addition to the components in the first example embodiment (see FIG. 2). The object detection unit 150 may be realized or implemented by the processor 11 (see FIG. 1).

The object detection unit 150 is configured to detect an object included in an image. For example, the object detection unit 150 is configured to detect a position or a size of the object in the image. The object section 150 may be configured to detect an outline or a presence area (e.g., a rectangular area surrounding the object) of the object. The object detection unit 150 may have a function of estimating a type, an attribute, and the like of the detected object. A detailed description of a specific detection method by the object detection unit 150 will be omitted here, because the existing techniques/technologies can be adopted as appropriate. Information about the object detected by the object detection unit 150 is configured to be outputted to the acquisition unit 120.

(Flow of Operation) Next, with reference to FIG. 5, a flow of operation of the information processing apparatus according to the second example embodiment will be described. FIG. 5 is a flowchart illustrating the flow of the operation of the information processing apparatus according to the second example embodiment. In FIG. 5, the same steps as those illustrated in FIG. 3 carry the same reference numerals.

Figure 5:
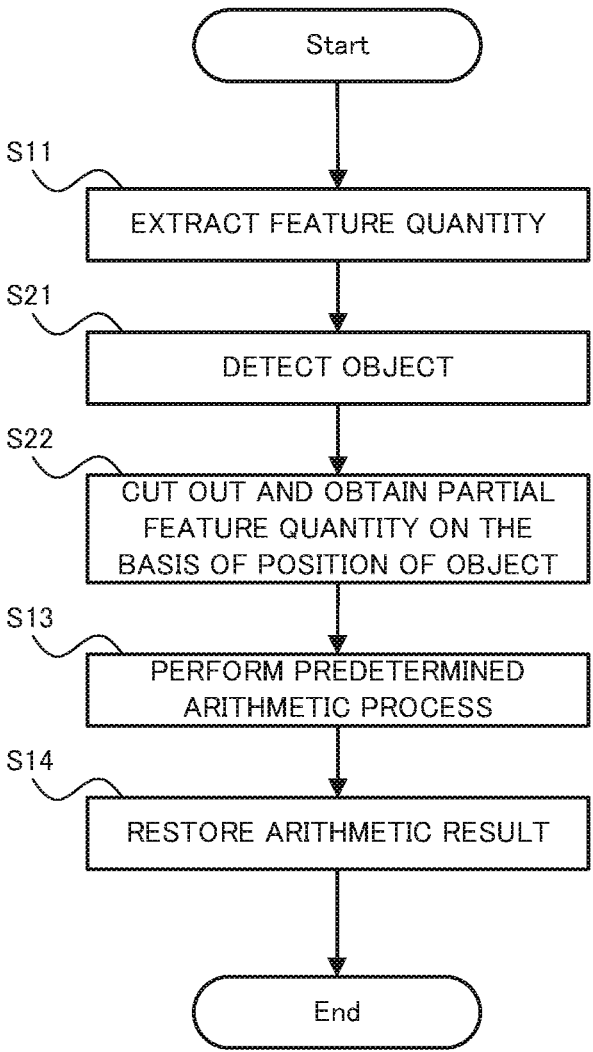
FIG. 5 is a flowchart illustrating a flow of operation of the information processing apparatus according to the second example embodiment.

As illustrated in FIG. 5, when the operation of the information processing apparatus 10 according to the second example embodiment is started, the extraction unit 110 extracts the feature quantity from the image data (step S11). On the other hand, the object detection unit 150 detects an object from the image data. (step S21). The step S21 may be performed before and after the step S11, or may be performed in parallel at the same time. As illustrated in FIG. 5, when detecting the object after the feature quantity is extracted, the object detection unit 150 may detect the object by using the feature quantity extracted by the extraction unit 110.

Subsequently, the acquisition unit 120 cuts out the partial feature quantity on the basis of the position of the detected object (step S22). For example, the acquisition unit 120 may cut out the feature quantity at a spot corresponding to the position at which the object is detected, and may obtain it as the partial feature quantity. When a plurality of objects are detected, the acquisition unit 120 may cut out the partial feature quantities on the basis of the positions of all the objects, or may cut out the partial feature quantities on the basis of the position(s) of a part of the objects. Alternatively, the acquisition unit 120 may cut out the feature quantity at a spot corresponding to the position at which the object is not detected, and may obtain it as the partial feature quantity. In addition, the acquisition unit 120 may perform a process of dividing an image into a plurality of divided areas (e.g., a process of drawing a cross line on a square image to divide it into four square areas, etc.) and may cut out the partial feature quantities by using the division areas in which the object exists Subsequently, the arithmetic unit 130 performs the arithmetic process by using the cutout partial feature quantity (step S13). Then, the restoration unit 140 restores the arithmetic result of the arithmetic unit 130 to the size of the original feature quantity (step S14).

Technical Effect

Next, a technical effect obtained by the information processing apparatus 10 according to the second example embodiment will be described.

As described with reference to FIG. 4 and FIG. 5, in the information processing apparatus according to the second example embodiment, the partial feature quantity is cut out on the basis of the position at which the object is detected. In this way, it is possible to cut out the partial feature quantity properly in view of the presence of the object. For example, it may be considered that more significant information is likely included in the position at which the object exists than in another position. In such a case, if the spot corresponding to the position of the object is cut out, it is possible to obtain a more appropriate partial feature quantity.

Third Example Embodiment

The information processing apparatus 10 according to a third example embodiment will be described with reference to FIG. 6 and FIG. 7. The third example embodiment is partially different from the first and second example embodiments only in the configuration and operation, and may be the same as the first and second example embodiments in the other part. For this reason, a part that is different from the first and second example embodiments will be described in detail below, and a description of other overlapping parts will be omitted as appropriate.
(Functional Configuration)

First, with reference to FIG. 6, a functional configuration of the information processing apparatus 10 according to the third example embodiment will be described. FIG. 6 is a block diagram illustrating the functional configuration of the information processing apparatus according to the third example embodiment. In FIG. 6, the same components as those illustrated in FIG. 2 carry the same reference numerals.

Figure 6:
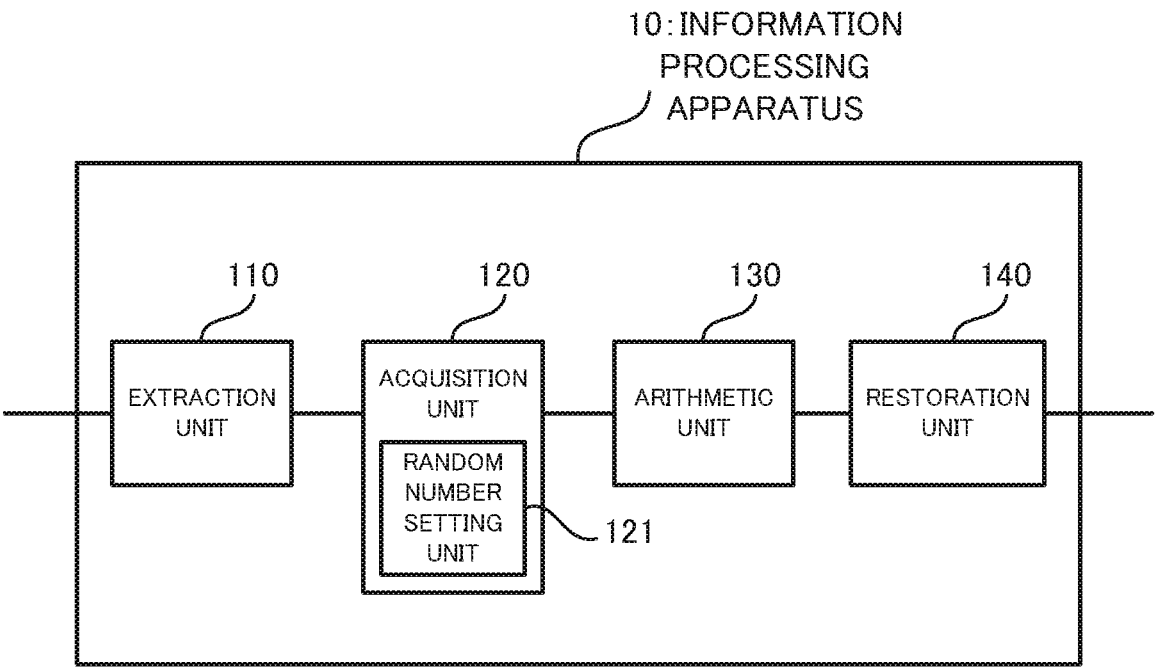
FIG. 6 is a block diagram illustrating a functional configuration of an information processing apparatus according to a third example embodiment.

As illustrated in FIG. 6, the information processing apparatus 10 according to the third example embodiment includes, as processing blocks for realizing its functions, the extraction unit 110, the acquisition unit 120, the arithmetic unit 130, and the restoration unit 140. In particular, the acquisition unit 120 according to the third example embodiment includes a random number setting unit 121.

The random number setting unit 121 is configured to set a random number used when the partial feature quantity is cut out from the feature quantity. The type of the random number here is not particularly limited, but may be a uniform distribution random number, or may be a normal distribution random number, for example. Alternatively, it may be a random number corresponding to a predetermined probability distribution.
(Flow of Operation)

Next, with reference to FIG. 7, a flow of operation of the information processing apparatus according to the third example embodiment will be described. FIG. 7 is a flowchart illustrating the flow of the operation of the information processing apparatus according to the third example embodiment. In FIG. 7, the same steps as those illustrated in FIG. 3 carry the same reference numerals.

Figure 7:
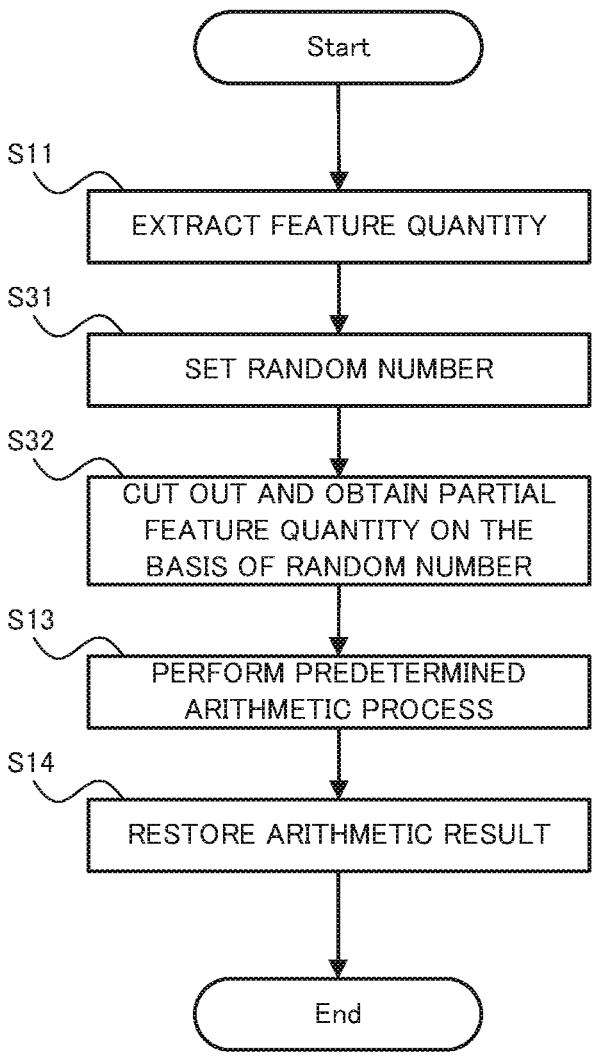
FIG. 7 is a flowchart illustrating a flow of operation of the information processing apparatus according to the third example embodiment.

As illustrated in FIG. 7, when the operation of the information processing apparatus 10 according to the third example embodiment is started, the extraction unit 110 firstly extracts the feature quantity from image data (step S11). Subsequently, the random number setting unit 121 sets the random number to be used when the acquisition unit 12 cuts out the partial feature quantity (step S31). Then, the acquisition unit 120 cuts out a part of the extracted feature quantity on the basis of the random number and obtains the partial feature quantity (step S32). Subsequently, the arithmetic unit 130 performs the arithmetic process by using the cutout partial feature quantity (step S13). Then, the restoration unit 140 restores the arithmetic result of the arithmetic unit 130 to the size of the original feature quantity (step S14).

Technical Effect

Next, a technical effect obtained by the information processing apparatus 10 according to the third example embodiment will be described.

As described in FIG. 6 and FIG. 7, in the information processing apparatus 10 according to the third example embodiment, the partial feature quantity is cut out on the basis of the random number (in other words, it is cut out randomly). In this way, it is possible to cut out the partial feature quantity, more easily. Specifically, it is possible to save time and labor of finely setting in advance a specific position to cut out the partial feature quantity. Alternatively, it is not necessary to perform another process for determining the position to cut out the partial feature quantity. Furthermore, it is possible to evenly select the position to be cut out as the partial feature quantity, from the whole image.

Fourth Example Embodiment

The information processing apparatus 10 according to the fourth example embodiment will be described with reference to FIG. 8. The fourth example embodiment is partially different from the third example embodiment (i.e., the example embodiment in which the partial feature quantity is cut out on the basis of the random number) only in the operation, and may be the same as the third example embodiment in the other part. For this reason, a part that is different from the example embodiments described above will be described in detail below, and a description of other overlapping parts will be omitted as appropriate.

(Flow of Operation)

First, with reference to FIG. 8, a flow of operation of the information processing apparatus according to the fourth example embodiment will be described. FIG. 8 is a flow-chart illustrating the flow of the operation of the information processing apparatus according to the fourth example embodiment. In FIG. 8, the same steps as those illustrated in FIG. 7 carry the same reference numerals.

Figure 8:
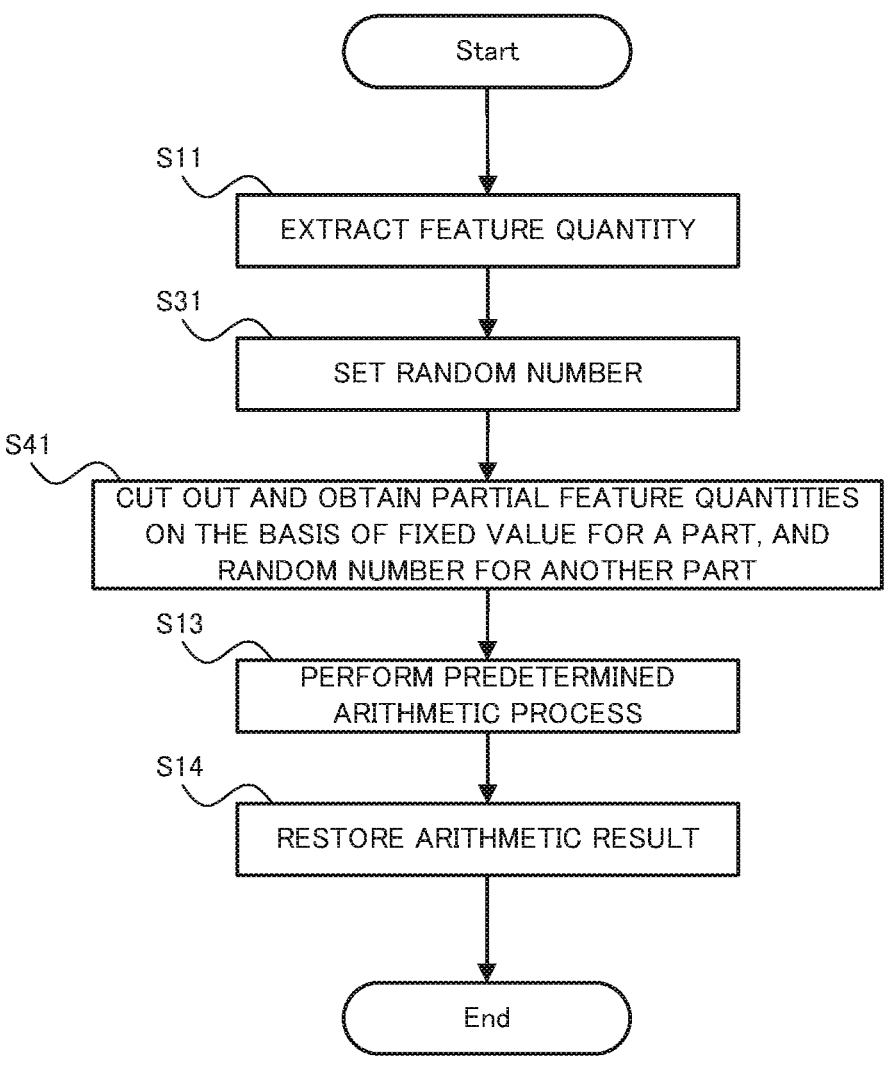
FIG. 8 is a flowchart illustrating a flow of operation of an information processing apparatus according to a fourth example embodiment.

As illustrated in FIG. 8, when the operation of the information processing apparatus 10 according to the fourth example embodiment is started, the extraction unit 110 firstly extracts the feature quantity from the image data (step S11). Subsequently, the random number setting unit 121 sets the random number to be used when the acquisition unit 12 cuts out the partial feature quantity (step S31).

Especially in the fourth example embodiment, the acquisition unit 120 cuts out and obtains a part of the partial feature quantity from a fixed position, and cuts out and obtains another part on the basis of the random number (step S41). The "fixed position" here may be a fixed position set in advance, or may be a fixed position calculated by another process (e.g., a process of detecting area in which the object exists, described in the second example embodiment).

Subsequently, the arithmetic unit 130 performs the arithmetic process by using the cutout partial feature quantity (step S13). Then, the restoration unit 140 restores the arithmetic result of the arithmetic unit 130 to the size of the original feature quantity (step S14).

Technical Effect

Next, a technical effect obtained by the information processing apparatus 10 according to the fourth example embodiment will be described.

As described in FIG. 8, in the information processing apparatus 10 according to the fourth example embodiment, a part of the feature quantity is cut out at the fixed position, and another part is cut out on the basis of the random number, so that the partial feature quantity is obtained. In this way, a part of the partial feature quantity is cut out from the fixed position. Thus, it is possible to cut out a more appropriate position as the partial feature quantity, as compared to when all is cut out on the basis of the random number. Furthermore, since another part excluding a part is cut out on the basis of the random number, it is possible to easily cut out the partial feature quantity, as compared to when all us cut out on the basis of the fixed position.

Modified Example

The fourth example embodiment exemplifies that a part of the partial feature quantity is obtained from the fixed position, and another part is obtained on the basis of the random number. However, all of the partial feature quantities may be obtained by cutting out from the fixed position. In this case, there is no part to be cut out on the basis of the random number, and thus, it is possible to cut out a more appropriate position as the partial feature quantity.

Fifth Example Embodiment

The information processing apparatus 10 according to a fifth example embodiment will be described with reference to FIG. 9 to FIG. 11. The fifth example embodiment is partially different from the first to fourth example embodiments only in the configuration and operation, and may be the same as the first to fourth example embodiments in the other part. For this reason, a part that is different from the example embodiments described above will be described in detail below, and a description of other overlapping parts will be omitted as appropriate.

(Functional Configuration)

First, with reference to FIG. 9, a functional configuration of the information processing apparatus 10 according to the fifth example embodiment will be described. FIG. 9 is a block diagram illustrating the functional configuration of the information processing apparatus according to the fifth example embodiment. In FIG. 9, the same components as those illustrated in FIG. 2 carry the same reference numerals.

Figure 9:
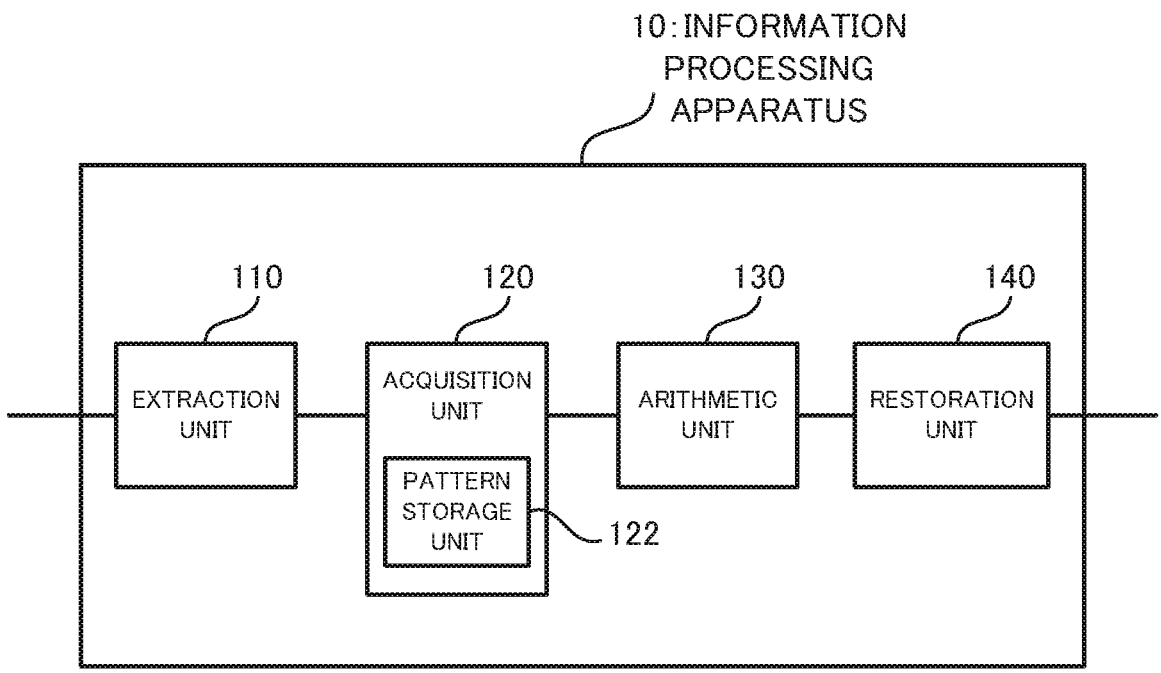
FIG. 9 is a block diagram illustrating a functional configuration of an information processing apparatus according to a fifth example embodiment.

As illustrated in FIG. 9, the information processing apparatus 10 according to the fifth example embodiment includes, as processing blocks for realizing its functions, the extraction unit 110, the acquisition unit 120, the arithmetic unit 130, and the restoration unit 140. In particular, the acquisition unit 120 according to the fifth example embodiment includes a pattern storage unit 122. The pattern storage unit 122 may be realized or implemented by the storage apparatus 14 (see FIG. 1)

The pattern storage unit 122 is configured to store a predetermined pattern indicating the position to cut out the partial feature quantity from the feature quantity. The predetermined pattern is not particularly limited, but may be set as a grid-like pattern, for example. The predetermined pattern may be set as a pattern indicating a position at which a more appropriate partial feature quantity can be cut out, on the basis of a prior simulation result or the like. Furthermore, the pattern storage unit 122 may be configured to store a plurality of patterns. In this instance, the acquisition unit 120 may select a patter to use to cut out the partial feature quantity, from among the plurality of patterns stored in the pattern storage unit 122. Alternatively, the acquisition unit 120 generates a cutout pattern by combining a plurality of patterns stored in the pattern storage unit 122 as appropriate, and may cut out the partial feature quantity on the basis of the cutout pattern.

(Flow of Operation)

Next, with reference to FIG. 10, a flow of operation of the information processing apparatus 10 according to the fifth example embodiment will be described. FIG. 10 is a flow-chart illustrating the flow of the operation of the information processing apparatus according to the fifth example embodiment. In FIG. 10, the same steps as those illustrated in FIG. 3 carry the same reference numerals.

Figure 10:
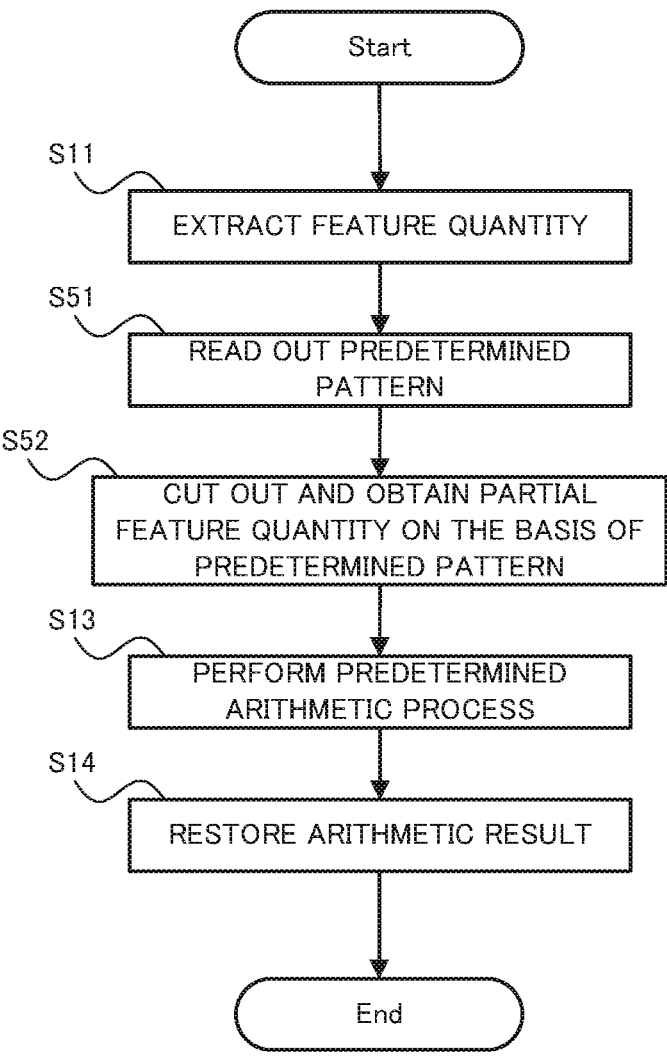
FIG. 10 is a flowchart illustrating a flow of operation of the information processing apparatus according to the fifth example embodiment.

As illustrated in FIG. 10, when the operation of the information processing apparatus 10 according to the fifth example embodiment is started, the extraction unit 110 firstly extracts the feature quantity from the image data (step S11). Subsequently, the acquisition unit 120 reads out the pattern to be used for cutting out the partial feature quantity from the pattern storage unit 122 (step S51). Then, acquisition unit 120 cuts out the partial feature quantity on the basis of the read pattern (step S52). Subsequently, the arithmetic unit 130 performs the arithmetic process by using the cutout partial feature quantity (step S13). Then, the restoration unit 140 restores the arithmetic result of the arithmetic unit 130 to the size of the original feature quantity (step S14).

(Specific Example of Pattern)

Next, a specific example of the predetermined pattern used in the information processing apparatus 10 according to the fifth example embodiment will be described with reference to FIG. 11. FIG. 11 is a conceptual diagram illustrating the pattern for cutting out the partial feature quantity from a feature map. The following exemplifies that the partial feature quantity is cut out from the feature map extracted as the feature quantity.

Figure 11:
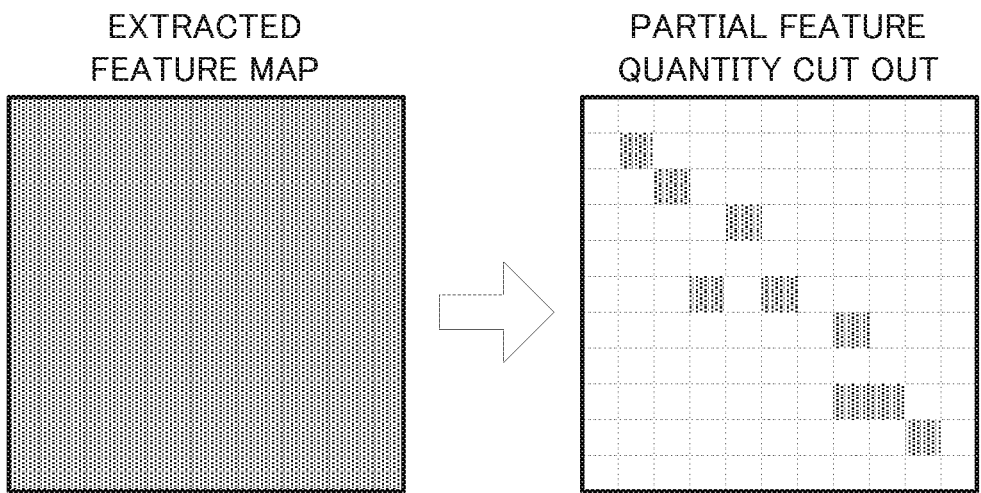
FIG. 11 is a conceptual diagram illustrating a pattern for cutting out a partial feature quantity from a feature map.

As illustrated in FIG. 11, the acquisition unit 120 according to the fifth example embodiment cuts out the partial feature quantity, on the basis of a predetermined grid-like pattern, from the feature map extracted as the feature quantity of the image data. In the example illustrated in FIG. 11, nine cells of partial feature quantities are cut out from a 11×11 grid. As described above, the acquisition unit 120 may divide the feature map into a grid-like shape, and may cut out only the cells at the positions indicated by the predetermined pattern, as the partial feature quantity. The pattern illustrated in FIG. 11 is merely an example, and the partial feature quantity may be cut out by using a different pattern from this.

Technical Effect

Next, a technical effect obtained by the information processing apparatus 10 according to the fifth example embodiment will be described.

As described with reference to FIG. 9 to FIG. 11, in the information processing apparatus according to the fifth example embodiment, the partial feature quantity is cut out on the basis of the predetermined pattern set in advance. In this way, it is possible to cut out the partial feature quantity, more easily. Specifically, if a part to be cut out as the partial feature quantity is set in advance as the predetermined pattern, it is possible to cut out the partial feature quantity as appropriate, by a simple process of reading out the predetermined pattern.

Sixth Example Embodiment

The information processing apparatus 10 according to a sixth example embodiment will be described with reference to FIG. 12 and FIG. 13. The sixth example embodiment is partially different from the first to fifth example embodiments only in the operation, and may be the same as the first to fifth example embodiments in the other part. For this reason, a part that is different from the example embodiments described above will be described in detail below, and a description of other overlapping parts will be omitted as appropriate.

(Flow of Operation)

First, with reference to FIG. 12 and FIG. 13, a flow of operation of the information processing apparatus 10 according to the sixth example embodiment will be described. FIG. 12 is a flowchart illustrating the flow of the operations of the information processing apparatus according to the sixth example embodiment. FIG. 13 is a conceptual diagram illustrating an operation of an attention mechanism of the information processing apparatus according to the sixth example embodiment. A detailed description of each term related to the attention mechanism will be omitted as appropriate in the following, because the attention mechanism is the existing technique/technology.

Figure 12:
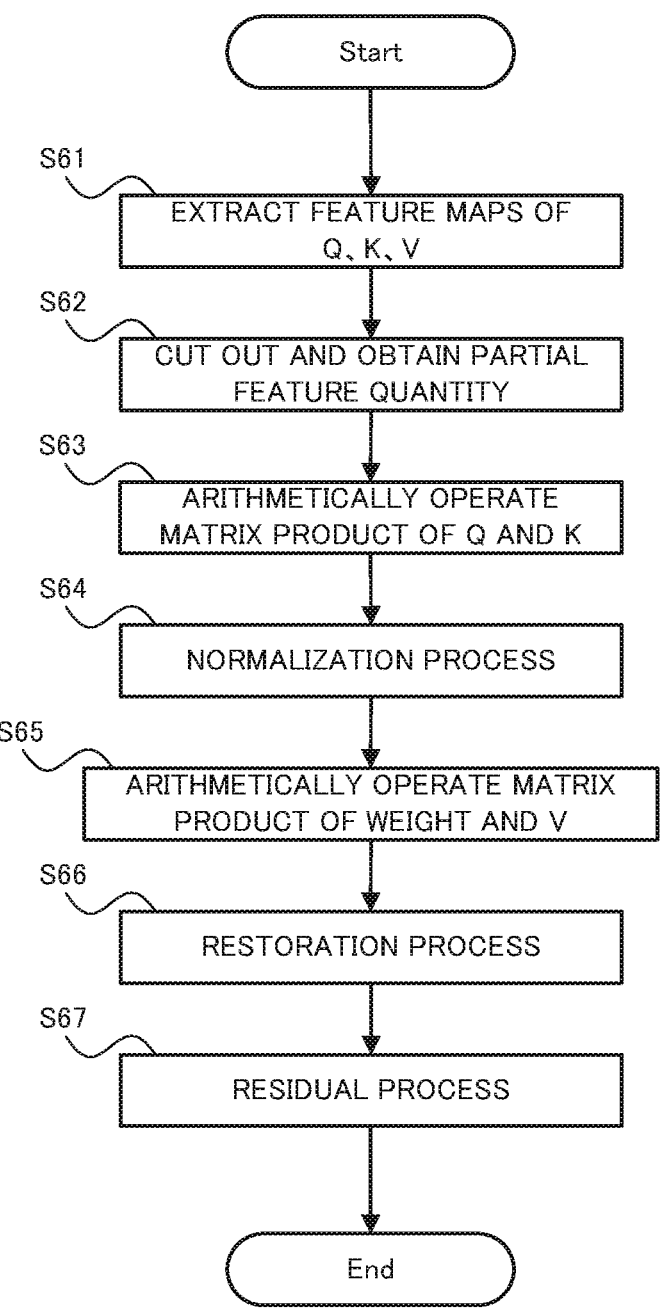
FIG. 12 is a flowchart illustrating a flow of operation of an information processing apparatus according to a sixth example embodiment.
Figure 13:
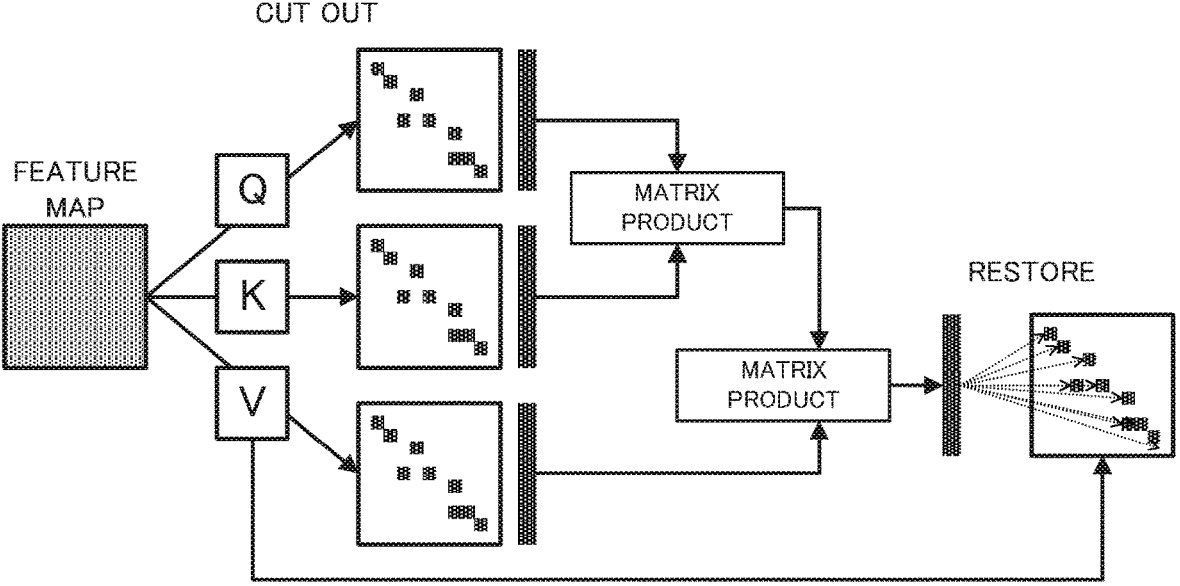
FIG. 13 is a conceptual diagram illustrating an operation of an attention mechanism of the information processing apparatus according to the sixth example embodiment.

As illustrated in FIG. 12 and FIG. 13, the operation of the information processing apparatus 10 according to the sixth example embodiment is realized as the operation of an attention mechanism provided in a neural network, for example. When the operation of the information processing apparatus 10 according to the sixth example embodiment is started, the extraction unit 110 firstly extracts feature maps of Q (Query), K (Key), and V (Value) from the image data (step S61). Then, the acquisition unit 120 cuts out a part from the extracted feature maps of Q, K, and V and obtains the partial feature quantity (step S62). Incidentally, from the feature maps of Q, K and V, a common position is cut out as the partial feature quantity (see FIG. 13).

Subsequently, the arithmetic unit 130 arithmetically operates a matrix product of the partial feature quantity cut out from the feature map of Q and the partial feature quantity cut out from the feature map of K (step S63). Then, the arithmetic unit 130 performs a normalization process on the matrix product arithmetically operated (step S64). The normalization process may use a soft max function, for example.

Subsequently, the arithmetic unit 130 arithmetically operates a matrix product of the matrix product of the partial feature quantity of Q and the partial feature quantity of K that is normalized (i.e., a weight) and the partial feature quantity cut out from the feature map of V (step S65). Then, the restoration unit 140 performs the restoration process on the matrix product arithmetically operated (step S66). The restoration unit 140 further performs a residual process (step S67).

Technical Effect

Next, a technical effect obtained by the information processing apparatus 10 according to the sixth example embodiment will be described.

As described with reference to FIG. 12 and FIG. 13, in the information processing apparatus 10 according to the fifth example embodiment, the process of the arithmetic unit is performed as the arithmetic process for the matrix product in the attention mechanism. In such a case, when the matrix product is arithmetically operated as it is by using the feature map, an arithmetic operation amount is huge in accordance with the size of the feature map. For example, when a vertical width and a horizontal width of the feature map are H and W, and the number of channels is C, the arithmetic operation amounts of the step S63 and the step S65 are expressed as in the following equations (1) and (2), respectively.

[Equation 1]

$$HW \times C' \odot C' \times HW \qquad (1)$$

[Equation 2]

$$HW \times HW \odot HW \times C' \qquad (2)$$

On the other hand, in the information processing apparatus 10 according to the fifth example embodiment, the matrix product is arithmetically operated by using the partial feature quantity cut out from the feature map as already described. Therefore, when the number of the cutout partial feature quantities is N, the arithmetic operation amounts of the step S63 and the step S65 are expressed as in the following equations (3) and (4), respectively.

[Equation 3]

$$N \times C' \odot C' \times N \qquad (3)$$

[Equation 4]

$$N \times N \odot N \times C' \qquad (4)$$

Here, a value of N is smaller than HW. Therefore, according to the information processing apparatus 10 in the fifth example embodiment, it is possible to reduce the arithmetic operation amount in the arithmetic process for the matrix product.

Seventh Example Embodiment

The information processing apparatus 10 according to a seventh example embodiment will be described with reference to FIG. 14. The seventh example embodiment describes a specific example of the restoration process in the sixth example embodiment (i.e., the example embodiment in which the matrix product of the attention mechanism is arithmetically calculated), and may be the same as the sixth example embodiment in the other part. For this reason, a part that is different from the example embodiments described above will be described in detail below, and a description of other overlapping parts will be omitted as appropriate.
(Flow of Operation)

First, with reference to FIG. 14, a flow of operation of the information processing apparatus 10 according to the seventh example embodiment will be described. FIG. 14 is a flowchart illustrating the flow of the operation of the information processing apparatus according to the seventh example embodiment. In FIG. 14, the same steps as those illustrated in FIG. 12 carry the same reference numerals.

Figure 14:
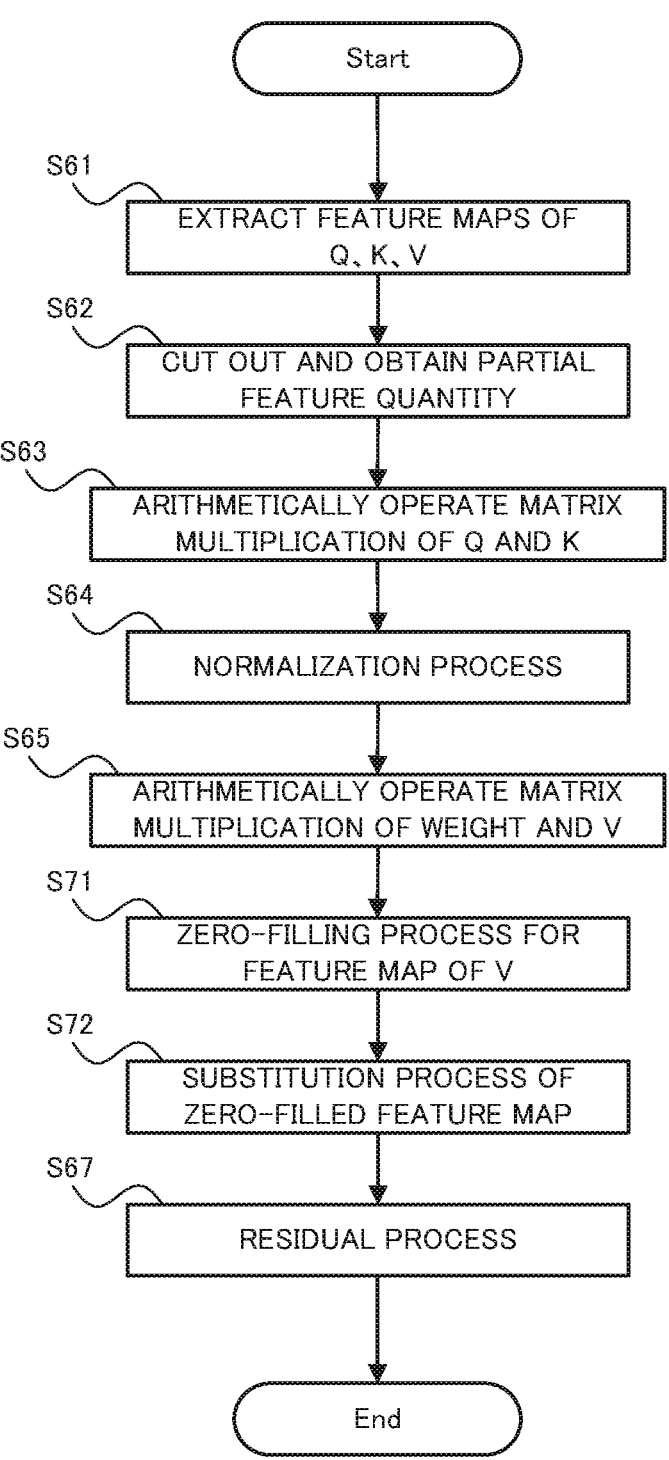
FIG. 14 is a flowchart illustrating a flow of operation of an information processing apparatus according to a seventh example embodiment.

As illustrated in FIG. 14, when the operation of the information processing apparatus 10 according to the seventh example embodiment is started, the extraction unit 110 firstly extracts the feature maps of Q (Query), K (Key), and V (Value) from the image data (step S61). Then, the acquisition unit 120 cuts out a part from the extracted feature maps of Q, K, and V and obtains the partial feature quantity (step S62).

Subsequently, the arithmetic unit 130 arithmetically operates the matrix product of the partial feature quantity cut out from the feature map of Q and the partial feature quantity cut out from the feature map of K (step S63). Then, the arithmetic unit 130 performs the normalization process on the matrix product arithmetically operated (step S64). Subsequently, the arithmetic unit 130 arithmetically operates the matrix product of the matrix product of the partial feature quantity of Q and the partial feature quantity of K that is normalized (i.e., the weight) and the partial feature quantity cut out from the feature map of V (step S65).

Subsequently, the restoration unit 140 performs a process of filling with "0" a part that is not cut out as the partial feature quantity (hereinafter referred to as a "zero-filling process" as appropriate) for the feature map of V (step S71). Then, the restoration unit 140 substitutes the feature map of V on which the zero-filling process is performed, for the arithmetic result in the step S65 (step S72). As described above, the restoration unit 140 according to the seventh example embodiment performs the steps S71 and S72, as the restoration process. Then, the restoration unit 140 performs the residual process (step S67).

Technical Effect

Next, a technical effect obtained by the information processing apparatus 10 according to the seventh example embodiment will be described.

As described with reference to FIG. 14, in the information processing apparatus 10 according to the seventh example embodiment, the restoration process is performed by substituting the feature quantity obtained by performing the zero-filling process on the part that is other than the cutout part. In this way, it is possible to restore the arithmetic result by the arithmetic unit 130 to the size of the original feature quantity, in a relatively simple process.

Eighth Example Embodiment

The information processing apparatus 10 according to an eighth example embodiment will be described with reference to FIG. 15 and FIG. 16. The eighth example embodiment is partially different from the first to seventh example embodiments only in the configuration and operation (specifically targeted for a video), and may be the same as the first to seventh example embodiments in the other part. For this reason, a part that is different from the example embodiments described above will be described in detail below, and a description of other overlapping parts will be omitted as appropriate.
(Functional Configuration)

First, with reference to FIG. 15, a functional configuration of the information processing apparatus 10 according to the eighth example embodiment will be described. FIG. 15 is a block diagram illustrating the functional configuration of the information processing apparatus according to the eighth example embodiment. In FIG. 15, the same components as those illustrated in FIG. 4 carry the same reference numerals.

Figure 15:
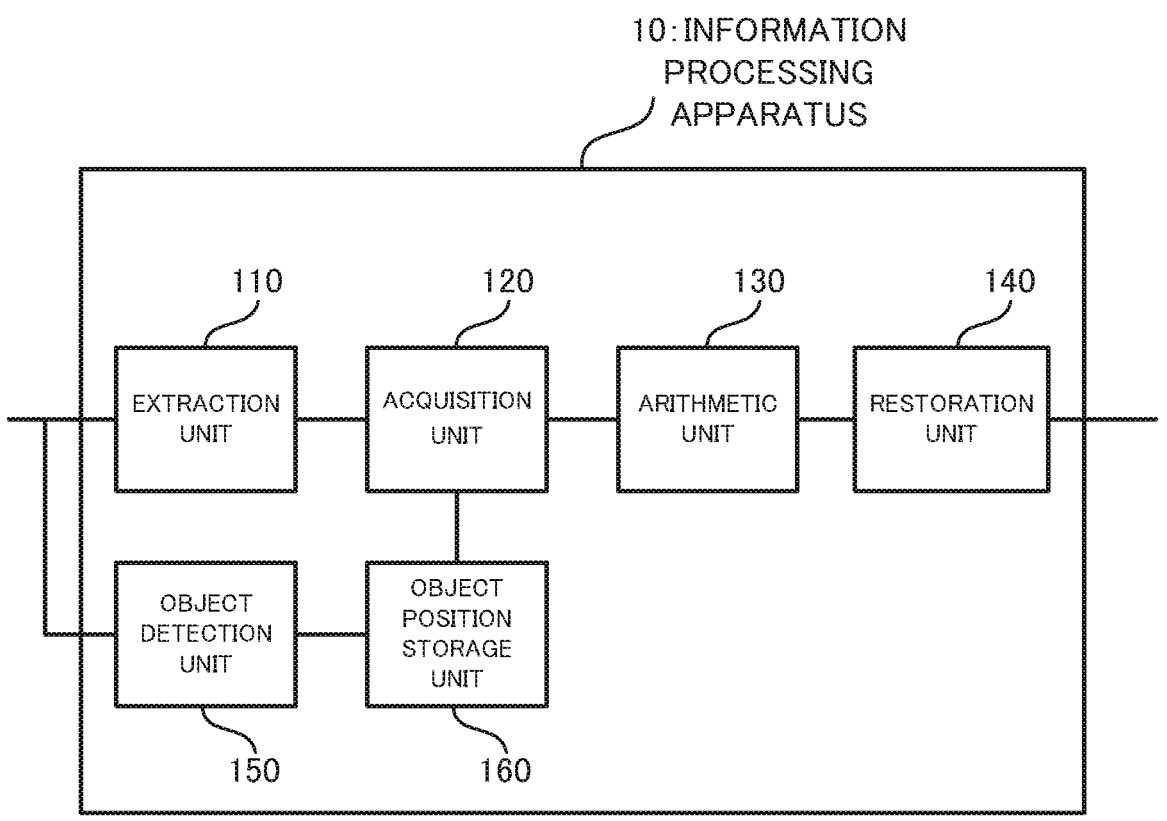
FIG. 15 is a block diagram illustrating a functional configuration of an information processing apparatus according to an eighth example embodiment.

As illustrated in FIG. 15, the information processing apparatus 10 according to the eighth example embodiment includes, as processing blocks for realizing its functions, the extraction unit 110, the acquisition unit 120, the arithmetic unit 130, the restoration unit 140, the object detection unit 150, and an object position storage unit 160. That is, the information processing apparatus according to the eighth example embodiment further includes the object position storage unit 160 in addition to the components in the second example embodiment (see FIG. 4). The object position storage unit 160 may be realized or implemented by the storage apparatus 14 (see FIG. 1).

The object position storage unit 160 is configured to store the position detected by the object detection unit 150 (i.e., the position at which the object exists in the image). When a plurality of objects are detected by the object detection unit 150, the object position storage unit 160 may be configured to store the respective positions of the plurality of objects. When a new object is detected, the object position storage unit 160 may store the position at each time. The object position storage unit 160 may have a function of deleting information about the position of the object that is unnecessary, as appropriate. The information about the position of the object stored in the object position storage unit 160 can be read by the acquisition unit 120, as appropriate.
(Specific Operation Example)

Next, a specific operation example of the information processing apparatus 10 according to the eighth example embodiment will be described with reference to FIG. 16. FIG. 16 is a conceptual diagram illustrating the specific operation example of the information processing apparatus according to the eighth example embodiment.

Figure 16:
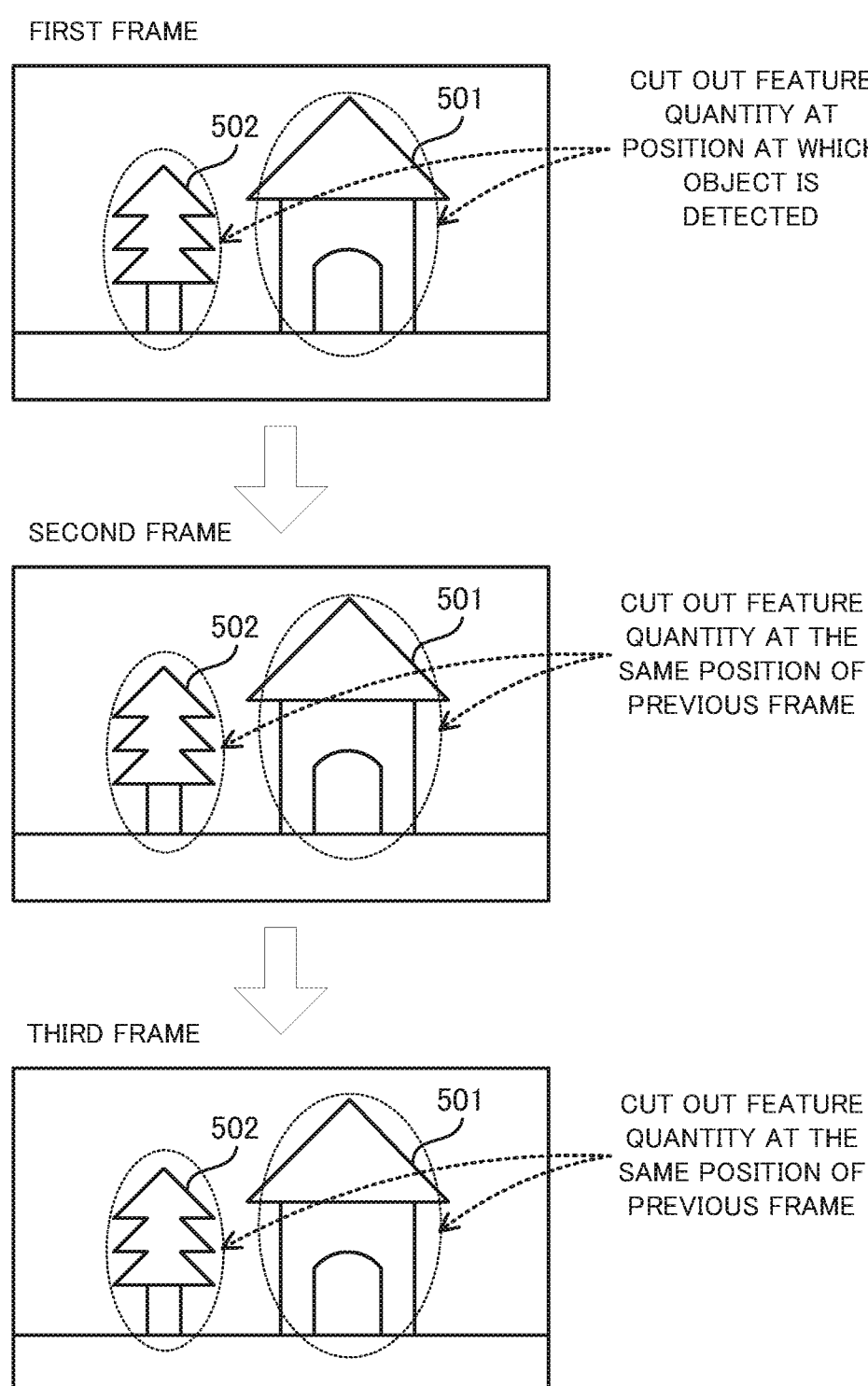
FIG. 16 is a conceptual diagram illustrating a specific operation example of the information processing apparatus according to the eighth example embodiment.

As illustrated in FIG. 16, it is assumed that a video in which a house 501 and a tree 502 are captured is inputted to the information processing apparatus 10 according to the eighth example embodiment. In this case, the object detection unit 150 detects the house 501 and the tree 502 when processing a first frame that is an initial frame. The object position storage unit 160 stores the positions of the house 501 and the tree 502 that are detected.

For the first frame, the acquisition unit 120 cuts out the partial feature quantity, on the basis of the positions of the house 501 and the tree 502 that are detected. Then, for a subsequent second frame, the acquisition unit 120 cuts out the partial feature quantity, on the basis of the positions of the house 501 and the tree 502 that are detected in the first frame. Similarly, for a subsequent third frame, the acquisition unit 120 cuts out the partial feature quantity, on the basis of the positions of the house 501 and the tree 502 that are detected in the first frame. As described above, in the information processing apparatus 10 according to the eighth example embodiment, even for subsequent frames, the partial feature quantity is cut out on the basis of the position of the object first detected.

A cutout position of the partial feature quantity may be changed at a predetermined timing. For example, when a scene of the video changes significantly, the object detection unit 150 detects the object again, and for the subsequent frames, the partial feature quantity may be cut out on the basis of the position of the object newly detected.

Technical Effect

Next, a technical effect obtained by the information processing apparatus 10 according to the eighth example embodiment will be described.

As described with reference to FIG. 15 and FIG. 16, in the information processing apparatus 10 according to the eighth example embodiment, when video data (i.e., the image data that are continuous in a time series) are handled, the position of the detected object is stored, and then, the partial feature quantity is cut out on the basis of the stored position of the object. In this way, the position of the object does not need to be detected for all frames, and it is thus possible to greatly reduce a processing load. The information processing apparatus 10 according to the eighth example embodiment is remarkably effective when a detection target is an object whose position in an image does not significantly change (e.g., an object that does not move like the house 501 and the tree 502 illustrated in FIG. 16).

Ninth Example Embodiment

The information processing apparatus 10 according to a ninth example embodiment will be described with reference to FIG. 17 and FIG. 18. The ninth example embodiment is partially different from the eighth example embodiment only in the configuration and operation (specifically, the point of tracking the position of the object), and may be the same as the eighth example embodiment in the other part. For this reason, a part that is different from the example embodiments described above will be described in detail below, and a description of other overlapping parts will be omitted as appropriate.

(Functional Configuration)

First, with reference to FIG. 17, a functional configuration of the information processing apparatus 10 according to the ninth example embodiment will be described. FIG. 17 is a block diagram illustrating the functional configuration of the information processing apparatus according to the ninth example embodiment. In FIG. 17, the same components as those illustrated in FIG. carry the same reference numerals.

Figure 17:
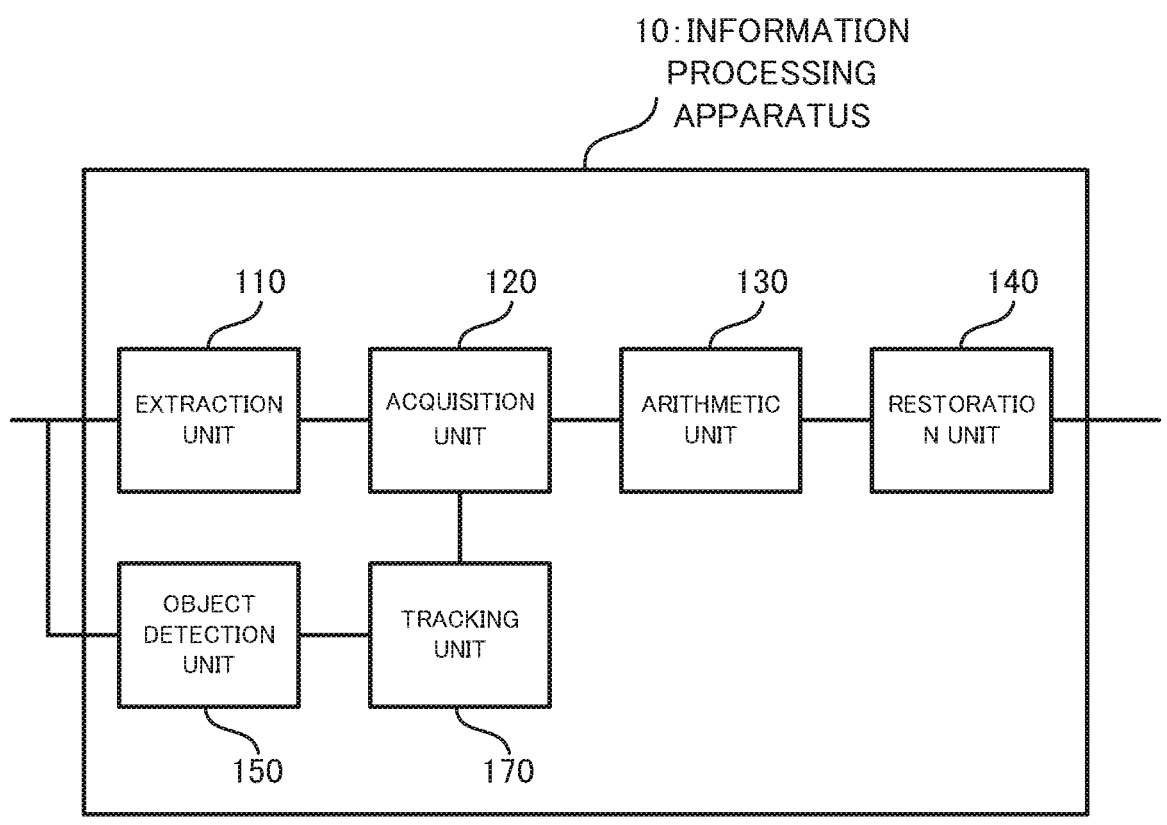
FIG. 17 is a block diagram illustrating a functional configuration of an information processing apparatus according to a ninth example embodiment.

As illustrated in FIG. 17, the information processing apparatus 10 according to the eighth example embodiment includes, as processing blocks for realizing its functions, the extraction unit 110, the acquisition unit 120, the arithmetic unit 130, the restoration unit 140, the object detection unit

150, and a tracking unit 170. That is, the information processing apparatus 10 according to the eighth example embodiment includes the tracking unit 170, instead of the object position storage unit 160 according to the eighth example embodiment (see FIG. 15). The tracking unit 170 may be realized or implemented by the processor 11 (see FIG. 1).

The tracking unit 170 is configured to perform a process of tracking (in other words, following) the position of the object detected by the object detection unit 150. The tracking unit 170 estimates and outputs the position of the object in each frame, from a moving direction or a moving velocity of the object, or the like, for example. A detailed description of specific processing content of a tracking process will be omitted, because the existing techniques/technologies can be adopted, as appropriate.

(Specific Operation Example)

Next, a specific operation example of the information processing apparatus 10 according to the ninth example embodiment will be described with reference to FIG. 18. FIG. 18 is a conceptual diagram illustrating the specific operation example of the information processing apparatus according to the ninth example embodiment.

Figure 18:
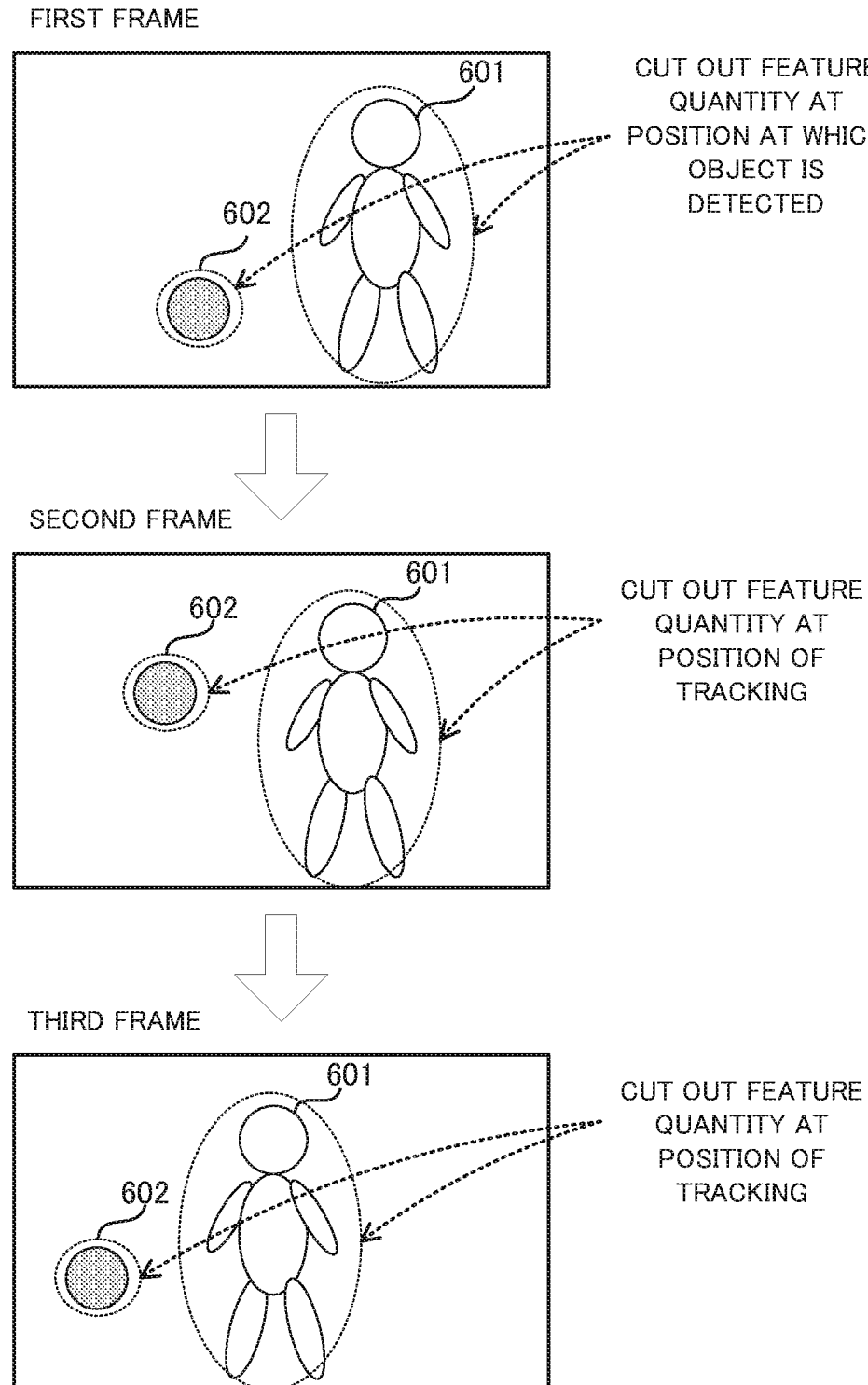
FIG. 18 is a conceptual diagram illustrating a specific operation example of the information processing apparatus according to the ninth example embodiment.

As illustrated in FIG. 18, it is assumed that a video in which a person 601 and a ball 602 are captured is inputted to the information processing apparatus 10 according to the ninth example embodiment. In this case, the object detection unit 150 detects the person 601 and the ball 602 when processing the first frame that is an initial frame. The tracking unit 170 tracks the person 601 and the ball 602 that are detected, and estimates the position of the person 601 and the position of the ball 602 in a subsequent frame.

For the first frame, the acquisition unit 120 cuts out the partial feature quantity on the basis of the positions of the person 601 and the ball 602 that are detected. Then, for a subsequent second frame, the acquisition unit 120 cuts out the partial feature quantity on the basis of the positions of the person 601 and the ball 602 estimated by the tracking process. Similarly, for a subsequent third frame, the acquisition unit 120 cuts out the partial feature quantity on the basis of the positions of the person 601 and the ball 602 estimated by the tracking process. As described above, in the information processing apparatus 10 according to the ninth example embodiment, the partial feature quantity is cut out on the basis of the tracked position of the object.

The tracking unit 170 may perform the tracking process on all objects in an image, or may perform the tracking process only on a part of the objects (e.g., an object with large movement or an object of high importance). For an object on which the tracking unit 170 does not perform the tracking process, the partial feature quantity may be extracted on the basis of the stored position of the stored object, as in the eighth example embodiment (refer to FIG. 15 and FIG. 16).

Technical Effect

Next, a technical effect obtained by the information processing apparatus 10 according to the ninth example embodiment will be described.

As described with reference to FIG. 17 and FIG. 18, in the information processing apparatus 10 according to the ninth example embodiment, when the video data (i.e., the image data that are continuous in a time series) are handled, the partial feature quantity is cut out by tracking the position of the object. In this way, it is possible to properly cut out the partial feature quantity in view of the position of the object in each frame (in other words, in view of the movement of the object). The information processing apparatus 10 according to the ninth example embodiment is remarkably effective when a detection target is an object whose position in an image significantly changes (e.g., an object that moves like the person 601 and the ball 602 illustrated in FIG. 18).

<Supplementary Notes>

The example embodiments described above may be further described as, but not limited to, the following Supplementary Notes below.

(Supplementary Note 1) An information processing apparatus described in Supplementary Note 1 is an information processing apparatus including: an extraction unit that extracts a feature quantity from image data; an acquisition unit that obtains a partial feature quantity by cutting out a particular position from the feature quantity; an arithmetic unit that performs a predetermined arithmetic process by using the partial feature quantity; and a restoration unit that restores a result of the predetermined arithmetic process to a size of the feature quantity.

(Supplementary Note 2)

An information processing apparatus described in Supplementary Note 2 is the information processing apparatus described in Supplementary Note 1, further including a detection unit that detects an object from the image data, wherein the particular position is a position at which the object is detected by the detection unit.

(Supplementary Note 3)

An information processing apparatus described in Supplementary Note 3 is the information processing apparatus described in Supplementary Note 1, wherein the particular position is determined on the basis of a random number.

(Supplementary Note 4)

An information processing apparatus described in Supplementary Note 4 is the information processing apparatus described in Supplementary Note 3, wherein the particular position is a fixed position at which one part is determined in advance, and another part excluding the one part is determined on the basis of the random number.

(Supplementary Note 5)

An information processing apparatus described in Supplementary Note 5 is the information processing apparatus described in Supplementary Note 1, wherein the particular position is a predetermined grid-like pattern.

(Supplementary Note 6)

An information processing apparatus described in Supplementary Note 6 is the information processing apparatus described in any one of Supplementary Notes 1 to 5, wherein the predetermined arithmetic process is a process of arithmetically operating a matrix product by using a plurality of partial feature quantities.

(Supplementary Note 7)

An information processing apparatus described in Supplementary Note 7 is the information processing apparatus described in any one of Supplementary Notes 1 to 6, wherein the restoration unit performs a process of filling, with a predetermined value, a spot corresponding to a part that is other than a part cut out as the partial feature quantity.

(Supplementary Note 8)

An information processing apparatus described in Supplementary Note 8 is the information processing apparatus described in any one of Supplementary Notes 1 to 7, wherein the image data are a plurality of image data that are continuous in a time series.

(Supplementary Note 9)

An information processing method described in Supplementary Note 9 is an information processing method including: extracting a feature quantity from image data; obtaining a partial feature quantity by cutting out a particular position from the feature quantity; performing a predetermined arithmetic process by using the partial feature quantity; and restoring a result of the predetermined arithmetic process to a size of the feature quantity.

(Supplementary Note 10)

A computer program described in Supplementary Note 10 is a computer program that operates a computer: to extract a feature quantity from image data; to obtain a partial feature quantity by cutting out a particular position from the feature quantity; to perform a predetermined arithmetic process by using the partial feature quantity; and to restore a result of the predetermined arithmetic process to a size of the feature quantity.

(Supplementary Note 11)

A recording medium described in Supplementary Note 11 is a recording medium on which the computer program described in Supplementary Note 10 is recorded.

This disclosure is not limited to the examples described above and is allowed to be changed, if desired, without departing from the essence or spirit of this disclosure which can be read from the claims and the entire specification. An information processing apparatus, an information processing method, and a computer program with such changes are also intended to be within the technical scope of this disclosure.

DESCRIPTION OF REFERENCE CODES

10 Information processing apparatus
11 Processor
110 Extraction unit
120 Acquisition unit
121 Random number setting unit
122 Pattern storage unit
130 Arithmetic unit
140 Restoration unit
150 Object detection unit
160 Object position storage unit
170 Tracking unit
501 House
502 Tree
601 Person
602 Ball

What is claimed is:
1. An information processing apparatus comprising:
at least one memory that is configured to store instructions; and
at least one processor that is configured to execute the instructions to;
extract a plurality of feature quantity maps from image data;
obtain a plurality of partial feature quantity which is smaller in size than the plurality of feature quantity maps by:
dividing each of the plurality of feature quantity maps into a grid, and
extracting one or more cells in a particular position in the grid from each of the plurality of feature quantity maps as the plurality of partial feature quantity;
perform a predetermined process for calculating a matrix product of the plurality of partial feature quantity obtained from each of the plurality of feature quantity maps; and restore the matrix product calculated by the predetermined process to a size of the plurality of feature quantity maps.

2. The information processing apparatus according to claim 1, wherein the at least one processor is configured to execute the instructions to detect an object from the image data, wherein the particular position is a position at which the object is detected by the at least one processor.

3. The information processing apparatus according to claim 1, wherein the particular position is determined based on a random number.

4. The information processing apparatus according to claim 3, wherein the particular position is a fixed position at which one part is determined in advance, and another part excluding the one part is determined based on the random number.

5. The information processing apparatus according to claim 1, wherein the particular position is a location in the grid according to a predetermined pattern.

6. The information processing apparatus according to claim 1, wherein the predetermined arithmetic process is a process of arithmetically operating a matrix product by using a plurality of partial feature quantities.

7. The information processing apparatus according to claim 1, wherein the at least one processor is configured to execute the instructions to perform a process of filling, with a predetermined value, a spot corresponding to a part that is other than a part extracted as the plurality of partial feature quantity.

8. The information processing apparatus according to claim 1, wherein the image data are a plurality of image data that are continuous in a time series.

9. An information processing method comprising:
extracting a plurality of feature quantity maps from image data;

obtaining a plurality of partial feature quantity which is smaller in size than the plurality of feature quantity maps by:
dividing each of the plurality of feature quantity maps into a grid, and
extracting one or more cells in a particular position in the grid from each of the plurality of feature quantity maps as the plurality of partial feature quantity;
performing a predetermined process for calculating a matrix product of the plurality of partial feature quantity obtained from each of the plurality of feature quantity maps; and
restoring the matrix product calculated by a result of the predetermined process to a size of the plurality of feature quantity maps.

10. A non-transitory recording medium on which a computer program that allows a computer to execute an information processing method is recorded, the information processing method including:
extracting a plurality of feature quantity maps from image data;
obtaining a plurality of partial feature quantity which is smaller in size than the plurality of feature quantity maps by:
dividing each of the plurality of feature quantity maps into a grid, and
extracting one or more cells in a particular position in the grid from each of the plurality of feature quantity maps as the plurality of partial feature quantity;
performing a predetermined process for calculating a matrix product of the plurality of partial feature quantity obtained from each of the plurality of feature quantity maps; and
restoring the matrix product calculated by a result of the predetermined process to a size of the plurality of feature quantity maps.

* * * * *